United States Patent [19]

Mohney et al.

[11] 4,124,112
[45] Nov. 7, 1978

[54] ODD-SHAPED CONTAINER INDEXING STARWHEEL

[75] Inventors: Harold F. Mohney, Maumee, Ohio; Darius O. Riggs, Ottawa Lake, Mich.; Walter K. Schoch, Maumee; Thomas B. Sorbie, Toledo, both of Ohio

[73] Assignee: Owens-Illinois, Inc., Toledo, Ohio

[21] Appl. No.: 799,897

[22] Filed: May 23, 1977

[51] Int. Cl.² ............................................. B65G 47/86
[52] U.S. Cl. ............................... 198/344; 198/479; 198/482; 198/696; 250/223 B
[58] Field of Search ............... 198/344, 379, 383, 384, 198/394, 478–482, 653, 655, 694, 696, 723; 250/223 B

[56] References Cited

U.S. PATENT DOCUMENTS

| | | | |
|---|---|---|---|
| 1,574,307 | 2/1926 | Risser | 198/482 |
| 2,109,360 | 2/1938 | Shurley | 198/344 |
| 2,426,355 | 8/1947 | Kellogg | 250/223 B |
| 2,511,534 | 6/1950 | Koppisch | 198/482 |
| 2,634,737 | 4/1953 | Rowe | 198/480 |
| 2,856,057 | 10/1958 | Skog | 198/653 |
| 2,992,058 | 7/1961 | Mullan | 198/479 |
| 3,250,406 | 5/1966 | Long et al. | 198/481 |
| 3,538,997 | 11/1970 | Christine et al. | 198/648 |
| 3,556,279 | 1/1971 | Cotter | 198/344 |
| 3,710,928 | 1/1973 | Van Zijp | 198/482 |
| 3,735,855 | 5/1973 | Johnson et al. | 198/723 |
| 3,783,992 | 1/1974 | Cook | 198/377 |
| 3,975,260 | 8/1976 | Peyton et al. | 198/479 |
| 4,023,513 | 5/1977 | Dean | 198/479 |

FOREIGN PATENT DOCUMENTS 19,010 4/1913 Denmark ................................. 198/480

Primary Examiner—Evon C. Blunk
Assistant Examiner—Richard K. Thomson
Attorney, Agent, or Firm—D. T. Innis; Myron E. Click; David H. Wilson

[57] ABSTRACT

Indexing mechanism for multiple station glassware inspection machines in which a plurality of pocketed starwheels are used. One set of pockets are formed with container encircling or restraining members which open and close in response to the contour of a box cam. The encircling members loosely retain containers so that they may be rotated about their vertical axes while held in a specific location. The finish of the containers is guided by an upper starwheel having pockets of a size commensurate with the size of the finish of the container. The containers to be inspected are brought into the starwheel with the encircling members opened. Upon closing of the encircling members, containers may be indexed through a series of positions where they may be inspected for various defects. Prior to arriving at the position where the containers are to be taken from the starwheel, the containers are oriented with their generally long, horizontal axes normal to the direction of movement of the conveyor for taking containers away. This apparatus permits rotation of non-round containers while still retaining the containers in a sufficiently precise location so as to permit both mechanical and optical inspection of various portions of the container.

5 Claims, 6 Drawing Figures

2

ODD-SHAPED CONTAINER INDEXING STARWHEEL

BACKGROUND OF THE INVENTION

It has been the practice in the past to inspect containers for defects by indexing the containers through a plurality of inspection stations positioned circumferentially about a bottle handling or indexing mechanism. The pockets which receive the containers of the prior art type of bottle handling system, for example, are shown in U.S. Pat. No. 3,599,780 issued Aug. 17, 1971 to T. B. Sorbie. The pockets in the starwheels are of a fixed dimension, depending upon the diameter of the container to be handled and a guide rail is positioned to restrain or hold containers within the pockets during their indexing movement from station to station through five inspection positions and then permit containers to be brought into the pockets, taken from the pockets or discarded from the pockets, depending upon the position of the pockets relative to the feeding of containers to the apparatus. A starwheel with fixed pockets and external rails to maintain the container within the pockets has been accomplished for the handling of round containers. However, there are containers which are of a non-round configuration, such as some prescription ware which has a generally square or rectangular cross-sectional configuration. Also, typically, salad dressing containers are of an oval cross-sectional configuration having small necks and relatively enlarged lower portions.

Another patent which shows inspection apparatus in which a pocketed starwheel is used to index the containers between and through inspection stations is U.S. Pat. No. 3,313,409 issued Apr. 11, 1967 to Johnson et al. In this particular patent, you will note that the sidewalls of the containers are engaged by a fixed rail which extends circumferentially about the machine. Containers, which may be rotated at various stations in order to effect the inspection thereof for defects, when round have no difficulty being rotated while restrained by a side-engaging rail which effectively engages only a very small portion of the side of the container when rotated in station. When considering the inspection of non-circular containers at the inspection positions where rotation is required, the present invention is necessary.

The present invention provides a mechanism in association with the starwheel which will permit encircling of a container of a non-round configuration and generally maintain the container with its vertical axis within a defined position so that the containers may be inspected by rotation of the container about its vertical axis and yet provide a system for handling of containers from station to station.

SUMMARY OF THE INVENTION

Apparatus for handling non-round containers through a sequence of circumferentially spaced inspection positions in which a plurality of containers are received and individually encircled loosely, indexed through a predetermined angle, yet permitting containers to be rotated about their vertical axes at the position to which they have been indexed, then bringing the containers to a position where they are oriented prior to movement of the containers from the handling mechanism.

DETAILED DESCRIPTION OF THE DRAWINGS

Figure 1:
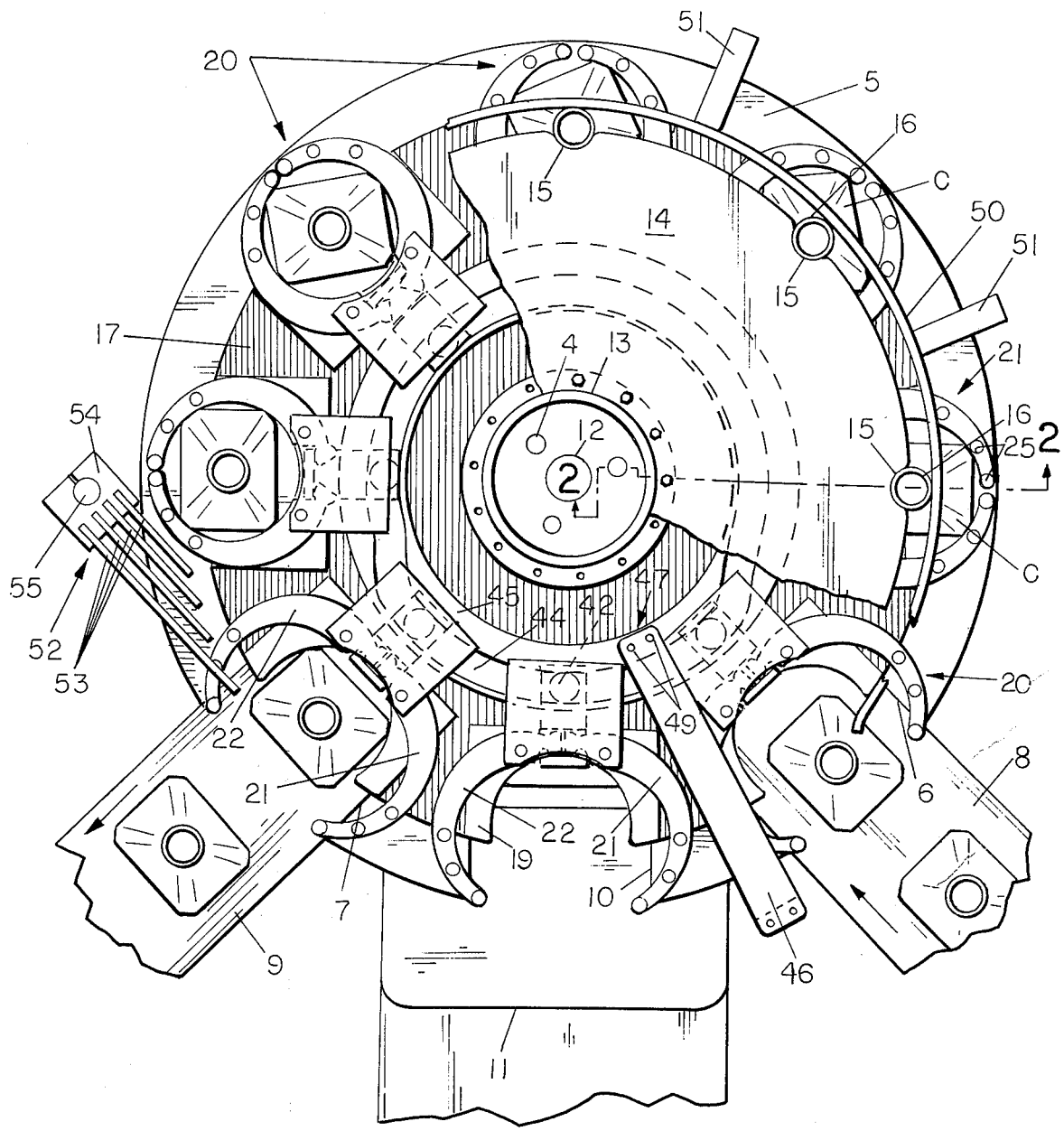
FIG. 1 is a plan view of the apparatus of the invention.
Figure 2:
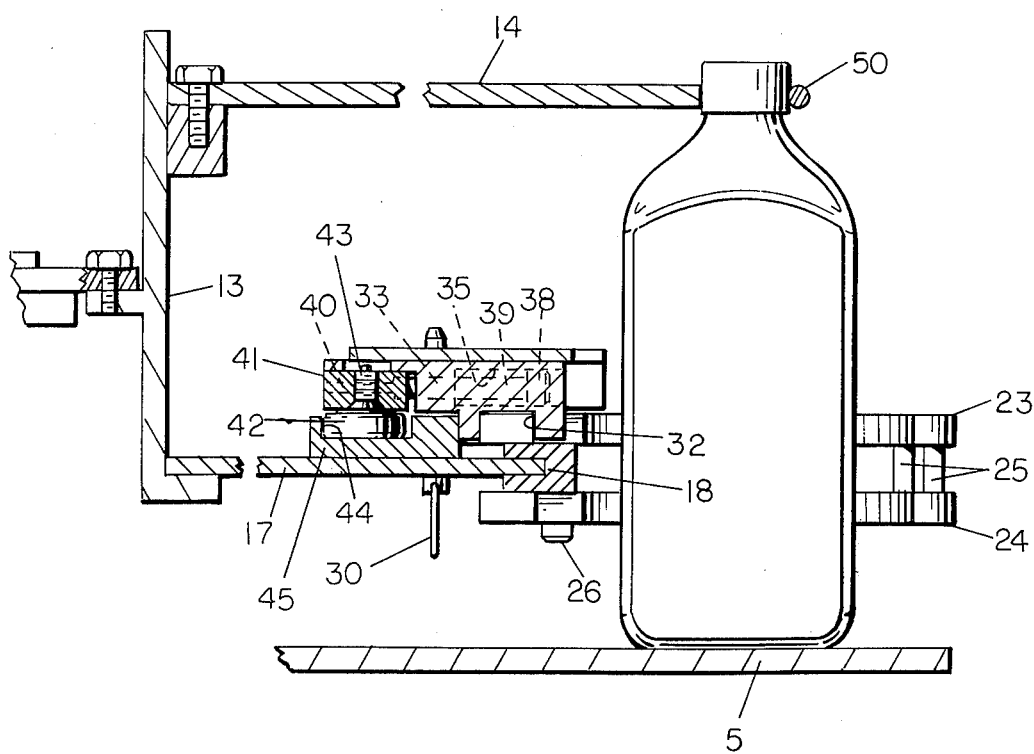
FIG. 2 is a cross-sectional view on an enlarged scale taken at line 2—2 of FIG. 1.

With particular reference to FIGS. 1 and 2, the apparatus comprises a generally circular base plate 5 which is fixed in the position shown. The plate 5 is provided with a pair of generally rectangular notches 6 and 7. These notches 6 and 7 provide, in the case of notch 6, access to the notch area by a conveyor 8 which will be moving in the direction of the arrow shown thereon. A conveyor 9, which serves as the take-out conveyor moving in a direction away from the plate 5, extends into the notch area 7. A third notch 10 is provided in the base 5 intermediate the two notches 6 and 7. The significance of notch 10 will be described in greater detail later. However, suffice it to say that this notch is positioned above a cullet chute 11 for conveying rejected containers to a cullet hopper or to a location where the machine operator can be informed of the presence of a defective container that has been inspected. The base plate 5 will be suitably supported in a manner similar to the plate shown in Sorbie U.S. Pat. 3,599,780, referred to above.

A vertically extending, indexing drive shaft 12 has bolted thereto at 4 a cylindrical hub 13. The hub 13 in turn supports an upper starwheel 14 which is provided, adjacent its circular periphery, with container neck-engaging pockets 15. As best shown in FIG. 1, these pockets 15 are of a size such that they generally surround approximately 180° of the circumference of a neck portion 16 of containers C.

Figure 3:
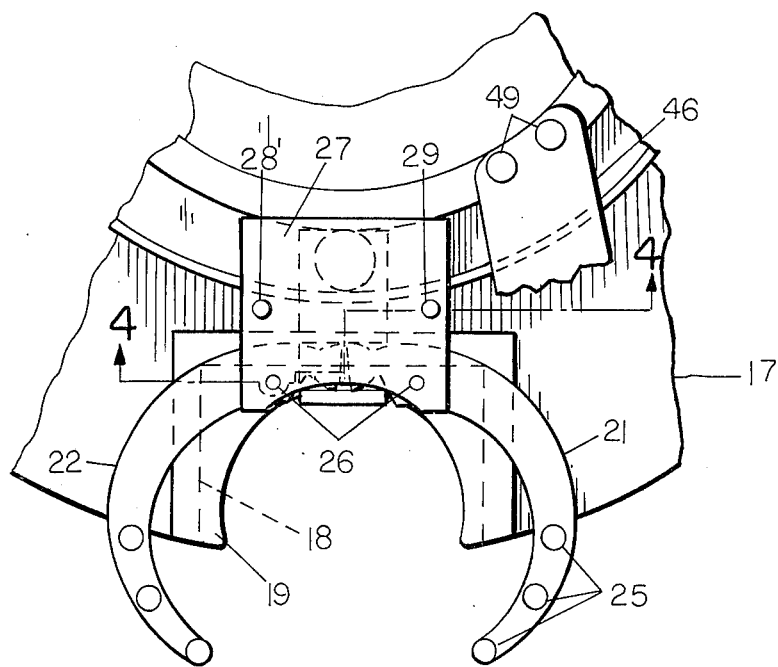
FIG. 3 is a top plan view of the encircling means of the invention.
Figure 5:
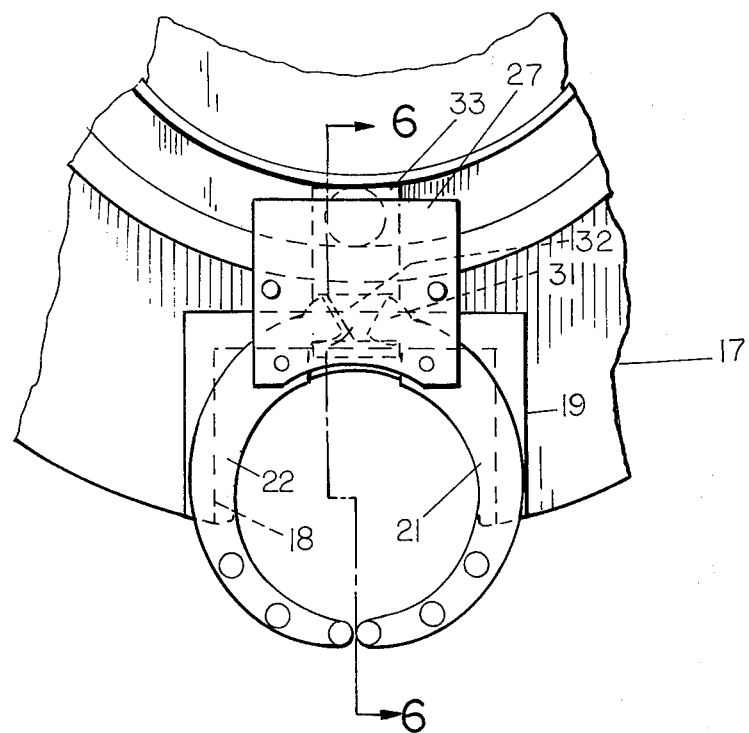
FIG. 5 is a plan view, similar to FIG. 3, showing the encircling means closed.

Beneath the upper starwheel 14, there is a lower star-wheel 17. The lower starwheel 17 is provided with eight generally rectangular cut-outs 18. The cut-outs 18 are provided with dove-tail edge insert members 19. As can best be seen in FIGS. 1, 3 and 5, these inserts 19 are formed with a circular cut-out of a given size depending upon the size of the containers to be handled.

Figure 4:
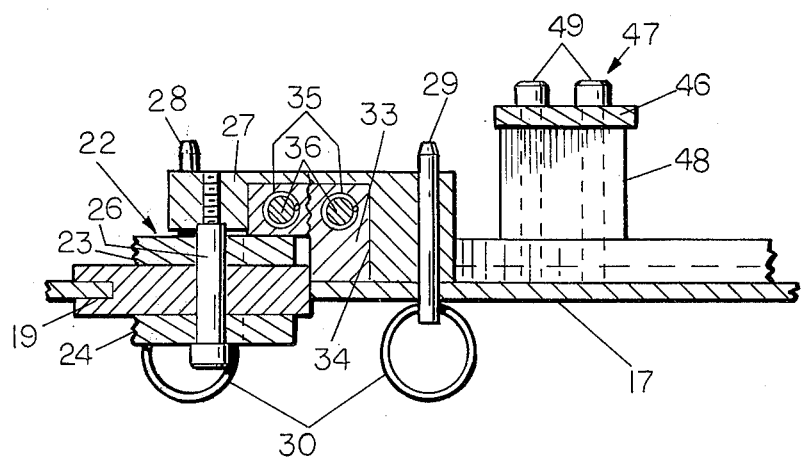
FIG. 4 is a sectional view taken at line 4—4 of FIG. 3.

With particular reference to FIG. 2, it can be seen that the lower starwheel 17 is positioned at a height relative to the base 5 and the height of container C such that it will engage containers at approximately the center of mass of the container. Each cut-out 18 defines a container positioning location on the starwheel mechanism of the invention and at each of these positions there is provided an encircling or restraining mechanism generally indicated 20. The encircling mechanism 20 takes the form of a pair of curved arms 21 and 22. Both the arms 21 and 22 are made up of a pair of superimposed, spaced-apart, sections 23 and 24 connected together at their outer ends by a series of spacer bolts 25. The bolts 25 maintain the two sections 23 and 24 spaced apart an amount slightly greater than the thickness of the inserts 19 so that the arms 21 and 22 may be moved relative to the inserts 19. The ends of the sections 23 and 24, remote from the spacer bolts 25, are pivotally connected to the inserts 19 by pivot bolts 26, as best shown in FIG. 4. The pivot bolts 26 extend through both arm sections 23 and 24 and a hole provided in the inserts 19 and are then threaded at their upper ends into a mounting block 27. The block 27 is fixed to the lower starwheel 17 by a pair of quick disconnect pins 28 and 29. These pins are provided with rings 30 by which they may be quickly and easily detached so that the arms 21 and 22 and the inserts 19 may be removed as a unit from the overall lower starwheel 17. This is to accommodate sets of inserts and encircling arms which are of different effective diameters. In this manner different sized containers may be handled by the present mechanism without complete overhaul of the starwheel set-up merely by changing the size of the pockets.

Adjacent the pivot bolts 26, the upper sections 23 of the arms 21 and 22 are provided with circular cam portions 31. These portions 31, of which there is but one for both the arm 21 and the arm 22, fit within a transverse slot 32 in an elongated slide 33. The slide 33 is positioned within an elongated slideway 34 formed in the mounting block 27. The slideway is generally in the shape of a rectangular tunnel with the lower wall formed by the upper surface of starwheel 17. The slide 33 has a pair of horizontal passageways 35 extending therethrough. These passageways are circular and step down to a smaller diameter at 36. The step-down 36 forms a shoulder against which a spring 37 will abut, with the other end of the spring abutting the inside of head 38 of bolts 39. The ends of the bolts 39, opposite the heads 38, are threaded at 40 and are thereby threaded into a block 41. As can best be seen in FIGS. 2 and 6, the block 41 is the mounting member for a cam follower wheel or roller 42. The wheel 42 is rotatably mounted on a vertical threaded shaft 43 which extends vertically through and threaded in the mounting block 41. The cam follower wheel 42 rides within a track 44 of a circular box cam 45.

As can best be seen when viewing FIG. 1, the cam track 44 is continuous through 360° about the hub 13 and effectively serves to guide the wheel radially so that the slide 33 will be moved toward the right, as viewed in FIG. 2, as the wheel 42 follows the cam track to effectively cause the arms 21 and 22 to open, as specifically shown at the three lowermost positions in FIG. 1. During the operation of the device, the cam track necessarily, in order to perform its function, must be stationary and held against rotation with the lower starwheel 17. To accomplish this, an arm 46, positioned between the location of the conveyor 8 and the cullet chute 11, is fastened at 47 to an upstanding post 48 which is bolted to the cam by bolts 49. The post 48 must be of sufficient height such that the restraining arms or encircling mechanisms and the mounting block 27 are capable of moving beneath the arm 46 during the index movement of the encircling mechanisms 20 in their counterclockwise movement. It should be understood that it is impossible for a container to be transferred from the position of the cullet chute to the position of the incoming conveyor 8. Thus the clearance of the arm 46 need only be as stated above. The outer end of the arm 46 may be connected or bolted to the stationary portion of the machine, for example, it could be bolted to the base plate 5.

Figure 6:
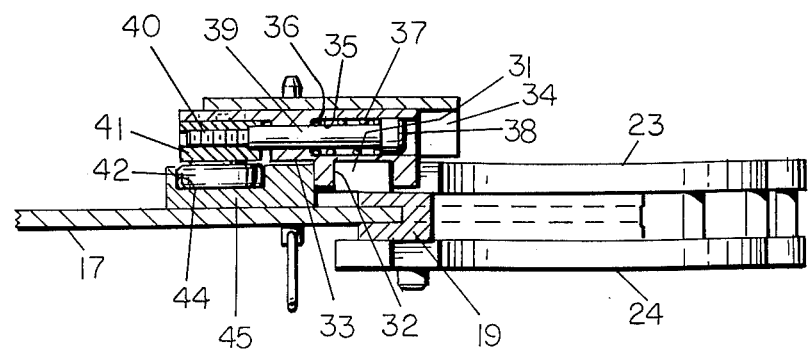
FIG. 6 is a cross-sectional view taken at line 6—6 of FIG. 5.

With particular reference to FIGS. 2 and 6, it should be noted that the wheel shaft 43 and mounting block 41 are movable as a unit relative to the slide 33 to a limited extent, with the spring 37, in effect, biasing the two members toward each other. In this manner interference with the opening and closing motions of the arms 21 and 22 will not shear the drive mechanism, but the spring permits dampening of the restraining movements such that even when the arms are closed and are hit or struck by some external forces, they will not be damaged. Furthermore, in the event the arms are not permitted to close due to interference or due to the fact that a container has not entered and become completely seated within the pocket formed in the inserts 19, again the arms will not break the supporting and operating slide connections since the spring 37 will permit some relative motion and take up this force. It should be noted that the neck or finish portion 16 of the containers, while being received in the pockets 15, will be retained in these pockets by the proximity of a guide rail 50 which is mounted on a series of support brackets 51. The rail 50 will extend from the position overlying the conveyor 8 to a position short of the conveyor 9.

As previously stated, the apparatus of the invention has particular utility in the handling of non-circular, cross-section glass containers through, as specifically shown herein, five stations where the containers may be rotated about their vertical axes for inspection of various characteristics of containers. An example of such an inspection device is shown in U.S. Pat. No. 3,313,409 mentioned above.

In the present invention, containers will arrive on the conveyor 8 at spaced intervals. When a container to be inspected is within the pocket, the entire starwheel hub 13 will be indexed through 45° to thereby position the container at the first inspection station. With regard to FIG. 1, this first inspection station would be where the section line 2—2 is taken. After a predetermined interval of time necessary to complete the inspection, the bottle will then be indexed one station at a time until it arrives at the station just in advance of conveyor 9. It should be kept in mind that during the transport of the bottles through the plural stations, they will be rotated about their axes while restrained by the arms 21 and 22 at one or more of the stations.

It is important that the containers, at the time they arrive at the position of the conveyor 9 where the arms 21 and 22 are opened, that the containers be oriented so that they will freely move out of the opened arms on the moving conveyor 9. To achieve this orientation, a bottle side-engaging member 52 comprising a plurality of fingers 53 which effectively brush the side of the containers will cause the containers to rotate relative to the arms 21 and 22, until the long side of the container is generally at right angles with respect to the radius of the starwheel 17. The fingers 53 are carried in a clamp 54 which in turn is mounted on a post 55. As shown in FIG. 1, the fingers 53 are mounted such that they are above the level of the arms 21 and 22. In actual practice, they have a width that is generally equal to the height of the arms 21 or 22 when considering both sections 23 and 24.

As explained in the above-referred-to Johnson patent, in the operation of the inspection apparatus, when containers are acceptable, they will be carried away from the gauging machine by conveyor 9. However, when a defective container is sensed by any one of the five inspection stations, or rather by the equipment which is positioned at any one of the five inspection stations, the container is prevented from moving out of the pocket of the starwheel 17 even though the arms 21 and 22 are open overlying the conveyor 9 so that upon further index of the starwheel in a counter-clockwise direction the container, which would normally have been released onto the conveyor 9, will be moved to the position over the cullet chute 11 at which time the defective container will fall vertically through the gap 10 formed in the base plate 5. The cam 45 which controls the opening and closing of the arms 21 and 22 will not exert excessive opening forces on the arms 21 and 22, inasmuch as these arms, when fully opened, will have the bolts 25, which are nearest the pivot points for the arms, engaging or about to engage the edge of the starwheel 17.

it should be appreciated that the apparatus of the invention may be used to handle bottles through a series of inspection positions and the only limitation with regard to this particular apparatus, when considering the size of containers that may be handled, would be the size of the cutouts 18. The diameter of the inserts 19, as previously stated, is determinative of the size of ware that may be handled with the particular inserts being used. However, the quick disconnect pins 29 may be pulled and the encircling mechanisms 20 and inserts 19 may be changed quickly with a larger or smaller set of inserts and arms being substituted for those presently on the machine.

We claim:

1. A non-round container handling starwheel for sequentially indexing upright containers to and through a series of circumferentially spaced positions where the containers are examined for defects either while being rotated about their vertical axes of held stationary, comprising:
   a generally circular base plate;
   a starwheel mounted above said base;
   a plurality of container body size pockets at spaced peripheral points of the circumference of said starwheel;
   said pockets having a generally hemispherical configuration of a diameter slightly larger than the largest horizontal dimension of the non-round container being handled;
   open and closeable container restraining and encircling means at each body pocket for receiving containers and closing thereabout to loosely encircle and restrain containers;
   said restraining means comprising a pair of curved, semi-circular arms, each semi-circular arm being formed of a pair of vertically spaced, identical, parallel members, joined together at their extending ends;
   means pivotally mounting said members of each arm to the body pockets with the members being respectively mounted above and below the pockets;
   fixed cam means mounted to said base and positioned above said starwheel;
   a cam follower, in engagement with said cam, at each pocket location and indexed with said starwheel;
   means connecting said followers to each said encircling and restraining means for opening and closing said encircling and restraining means in response to the rotational position of the respective pocket relative to the cam;
   indexing drive means connected to said starwheel to move said starwheel about a central vertical axis;
   means for bringing containers to said starwheel; and
   means for carrying containers therefrom.

2. The apparatus of claim 1 wherein said body size pockets are formed in a plate, and quick disconnect means for mounting said plate on said starwheel.

3. The apparatus of claim 2 wherein said restraining means is pivotally mounted on said plate for changing as a unit from one size pocket to another.

4. The apparatus of claim 3, wherein said means connecting said cam followers to each restraining and encircling means comprises a reciprocable slide and motion-dampening means between said slide and said cam follower.

5. The apparatus of claim 4, wherein said motion-dampening means comprises:
   a mounting block for said follower; and
   means intermediate said block and said slide for biasing said block and slide toward each other, but permitting limited relative movement whereby impacts to said arms will be dampened and damage avoided.

* * * * *